United States Patent [19]
Markham

[11] 3,969,955
[45] July 20, 1976

[54] PRESS BRAKE SAFETY DEVICE

[75] Inventor: Robert D. Markham, Peoria, Ill.

[73] Assignee: H C Products Co., Princeville, Ill.

[22] Filed: Aug. 14, 1975

[21] Appl. No.: 604,595

[52] U.S. Cl. ................................... 74/613; 74/615; 100/53
[51] Int. Cl.² ............................................ F16P 3/04
[58] Field of Search ............. 74/615, 614, 613, 612; 100/53

[56] References Cited
UNITED STATES PATENTS

| | | | |
|---|---|---|---|
| 3,067,798 | 12/1962 | Reznick | 74/613 X |
| 3,186,256 | 6/1965 | Reznick | 74/615 |

FOREIGN PATENTS OR APPLICATIONS

| | | | |
|---|---|---|---|
| 146,991 | 12/1903 | Germany | 74/615 |
| 780,573 | 8/1957 | United Kingdom | 74/615 |
| 781,722 | 8/1957 | United Kingdom | 74/615 |

*Primary Examiner*—Samuel Scott
*Assistant Examiner*—F. D. Shoemaker
*Attorney, Agent, or Firm*—McCaleb, Lucas & Brugman

[57] ABSTRACT

A simplified safety guard assembly for use with a press brake or like machine tool to prevent operator access to the die and anvil zone during stamping operations. The guard preferably utilizes a see-through shield or guard panel located between the operator and forming die and mounted for vertical sliding movement to follow various positional elevations of the workpiece attending one or more forming operations in the press. In addition, the shield or guard panel is pivotally movable about a horizontal axis to facilitate convenient extraction of the formed workpiece from the press.

4 Claims, 10 Drawing Figures

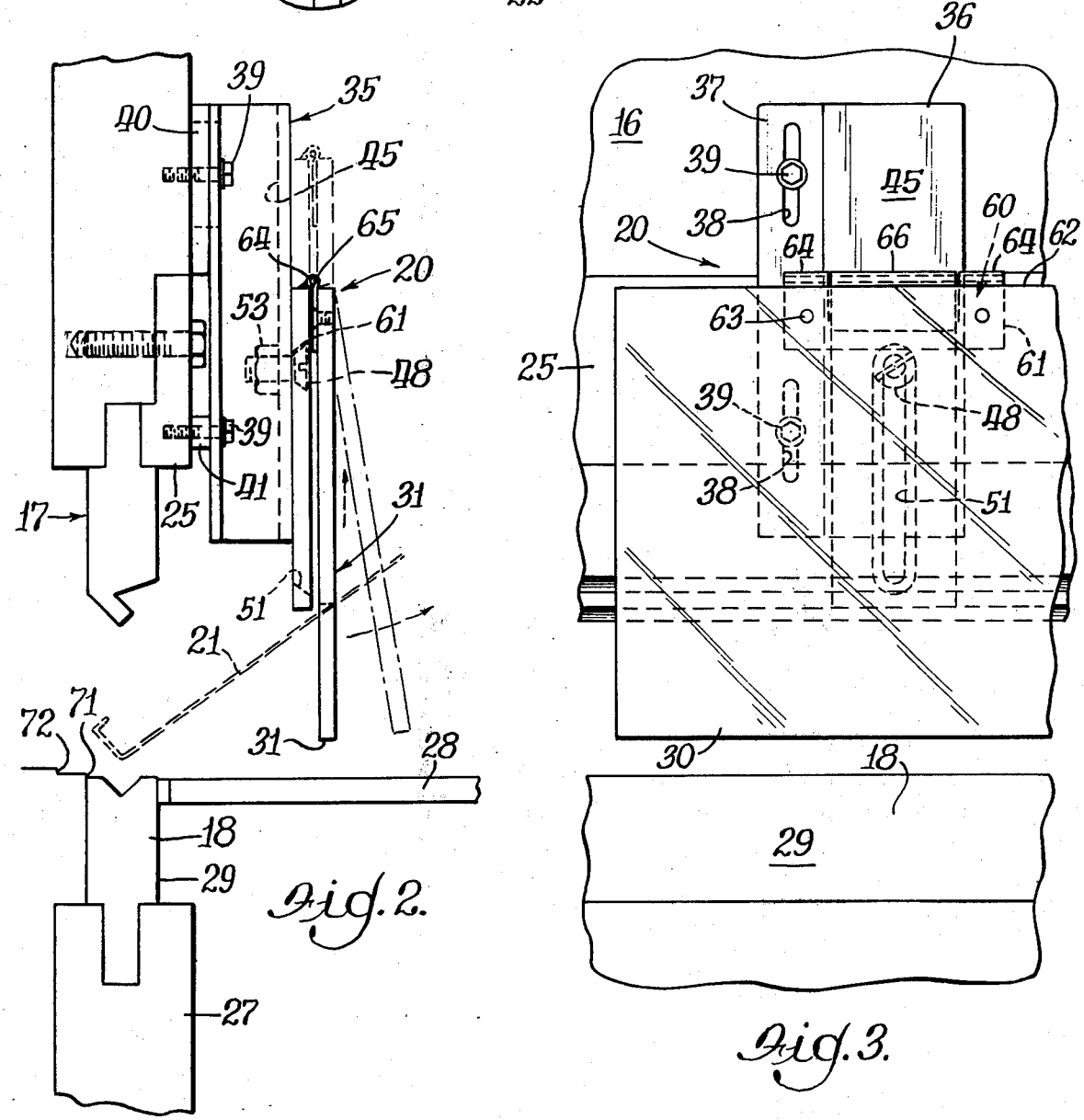

PRESS BRAKE SAFETY DEVICE

The familiar press brake for forming bends and angles in sheet metal is a particularly dangerous instrumentality from the standpoint of operator safety. This is pointedly emphasized when metal sheets are hand held and fed by the operator during stamping operations, since the forming anvil and die are positioned close to the front of the machine, making it all too convenient for the operator to accidentally place his limbs or digits in the die zone.

In order to protect the operator from the inherent dangers of the press brake, as above briefly outlined, various safety devices have been developed including mechanical handcuffs or guards which lock about the operator's arms or wrists and mechanically hold the operator from the die zone during press operation. This type of safety device is not always effective primarily due to operator discomfort and the attendant restriction of operator movement which seriously hampers hand feed operations of the press. Other known systems employ remote control switches, such as foot pedals or floor switches, while still others use electronic "eye" or light shield systems which require the operator to move to a specified safe zone or position in order to operate the press. Again, these systems have not enjoyed popular acceptance because of the obvious increase in operating time and attendant loss of productivity. More recently, physical safety shields have been provided which automatically drop into a near contacting relationship with the workpiece or to a predetermined lowered position between the operator and the die zone upon initiation of the down stroke of the die ram. Conversely, such shields are retracted upwardly automatically as the die completes its operation to permit the operator to extract the workpiece from the press. Generally, this latter type of system employs sophisticated electrical or electronic controls and switching arrangements to prevent press operation until the safety shield is in predetermined position and many times is operationally conditioned by the placement and presence of the workpiece. The success of such automatic control systems has not found particular favor with the operators due principally to the fact that if the positional limits of the shield or workpiece get out of adjustment, the press is shut down until readjustment is effected. Consequently there is a resulting loss of production time while the safety system is realigned. In addition, the sophisticated circuitry and switching systems employed are prone to malfunction and loss of adjustment due to the vibrational forces attendant press operation.

In general it may be stated that under current increased emphasis on operator safety, particularly as imposed by Federal regulations, an improved safety device for brake presses and like industrial instrumentalities which is convenient to use, positive in its accident preventing function and not unduly restrictive of operator movement and productivity is desired. It is to this end that the present invention is directed.

In brief, the present invention comprises an elongated, preferably see-through safety shield or panel which is mounted in position over the front of the press brake so as to vertically depend to a position where its lower edge is immediately above the workpiece and between the operator and the die or work zone. Slidable mounting means are provided to permit the safety shield to move upwardly and downwardly in response to changes in vertical position of the workpiece, as attend the forming operations. In addition, the panel mounting means includes horizontal pivotal support means which permit the shield to swing outwardly into a non-interfering position for convenient extraction of the workpiece and to return to guard position at completion of a stamping operation. Inasmuch as there are no electrical or mechanical controls effecting the operation of the press in relation to the positioning of the safety shield, down time of the machine due to malfunctioning of the safety system is substantially eliminated. Furthermore, since there are no mechanical means or systems such as handcuffs or braces coupled to the operator's limbs, one is free to move and operate the press in a generally unfettered fashion which promotes hand feeding and hand held workpiece operations or alternatively mechanical feed operations.

It is the primary object of this invention to provide a new, improved and simplified operator safety device particularly adapted for the use with press brakes and like machines.

A further object of this invention is to provide an improved safety device, as aforesaid, utilizing a see-through safety panel or shield which permits visual perception of the die zone by the operator.

A still further object of this invention is to provide an improved safety shield, as set forth in the immediately preceding object, which positively prevents entry of the operator's limbs and digits to the die zone so long as the shield is in operating position.

Still another object of this invention is to provide an improved safety shield for a brake press which gravitationally follows vertical positions of the workpiece and provides convenient extraction thereof from the die zone while insuring safety protection to the operator.

Having thus described this invention, the above and further objects, features and advantages thereof will appear to those familiar with the art from the following detailed description of a preferred embodiment of its features as illustrated in the accompanying drawings and representing the best mode of the invention presently contemplated so as to enable those familiar with the art to make and practice the same.

In the drawings:

FIG. 1 is a partial perspective view of a typical press brake illustrating the safety device of this invention mounted in operating position thereon;

FIG. 2 is an end elevational view of the press brake elements immediately adjacent the work zone thereof and showing the mounted positioning of the safety device and illustrating its operational movements;

FIG. 3 is a partial front elevational view of the assembled parts illustrated in FIG. 2 and particularly showing one of the mounting means employed for mounting the safety device on the press brake;

Figure 5:
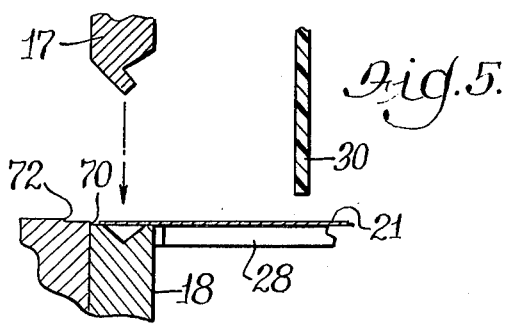
FIGS. 5 through 10 are schematic illustrations showing the sequential operational movements and positions of the die, anvil and safety shield of this invention throughout multiple bend formation of a workpiece.

Turning now to the particulars of the preferred embodiment illustrated in the drawings, specific reference is initially made to FIG. 1 showing a typical press brake 15 having a reciprocally and vertically movable ram head 16 carrying an elongated forming die 17 for cooperation with an underlying anvil 18 according to familiar practice. The improved safety device of this invention indicated generally by numeral 20, is mounted along the lower edge of the ramhead 16 for precluding operator access to the work space or zone between the die and the anvil in operation. This is amply illustrated in FIG. 1 whereat an operator is shown hand feeding individual workpieces 21, from a stack 22 thereof beneath the safety device 20 for forming operations in the press.

While the full structural details and aspects of the press brake will not be described herein, the essential portions thereof pertinent to the current invention are amply illustrated in FIGS. 2 and 3 of the drawings. With specific reference to FIG. 2, it will be understood that the ramhead 16 of the press brake carries a forming die 17 along its lower edge, such die being locked in position by lock rail 25 and machine bolt fasteners 26, or the like, according to conventional practice. It also will be appreciated that the die 17 comprises an elongated member extending substantially lengthwise of the lateral dimensions for the ramhead 16 and is adapted to depend therebelow for cooperating interfitting engagement with the underdisposed and female mating portion of the elongated anvil 18 carried on undersupport member 27. A planar feed table 28 for supporting the workpiece 21 during the infeed and discharge operations in particular, is mounted adjacent the infeed side 29 of the anvil and generally extends along a sufficient portion of the anvil to undersupport the size of workpieces to be formed in the press.

Figure 4:
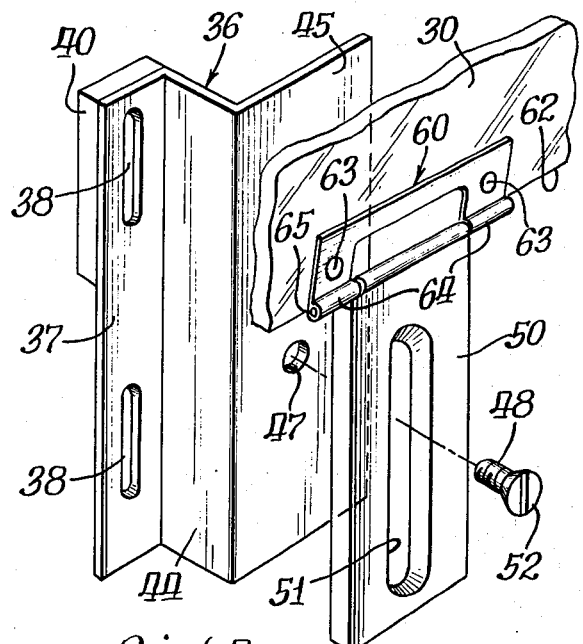
FIG. 4 is an exploded perspective view of the principal elements involved in the mounting means shown in FIG. 3.
Figure 9:
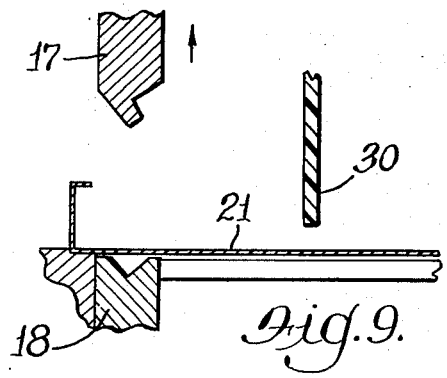

The particulars of the improved safety device will best be recognized from FIGS. 2, 3 and 4 of the drawings from which it will be seen that such device or assembly comprises an elongated substantially rectangular shaped and preferably transparent or see-through safety panel 30 which may be formulated from a planar sheet of clear plastic material. The length of the safety panel 30 is designedly substantially equal to that of the lateral dimension for the ramhead 16 so as to extend across the full width of the available spacing between the die and anvil, i.e., the work zone of the press, to preclude operator intrusion thereof in operation.

Generally speaking, the panel 30 is mounted in parallel spaced relation over the front of the ramhead and parallel to the work table 28 so that the lower edge 31 thereof is disposed immediately over and in slightly spaced relation to a workpiece 21 being operated on. In order that the panel 30 may be mounted throughout a desired range of vertical adjustment positions, a pair of improved mounting assemblies 35 are provided which are best shown in FIGS. 3 and 4 of the drawings. As therein illustrated, each mounting assembly 35 comprises a metal mounting bracket 36 of generally Z-shaped cross-section. Each such bracket includes a planar mounting flange 37 having a pair of coaxially aligned elongated slotted openings 38, 38 for reception of spaced mounting bolts 39. The flange 37 is affixed to the lower marginal portions of the ramhead 16 and with the elongated axis thereof at right angles to the lower edge of the ramhead and the die 17 supported therebeneath. A spacing pad or block 40 is provided between the back face of the flange 37 and the ramhead while corresponding spacer member 41 (see FIG. 2) is employed between the flange portion 37 and the rail member 25 in mounting the bracket in position. The provision of the slotted openings 38, of course, permits a wide range of vertical adjustment positions for the bracket 36.

Extending outwardly at right angles from one lateral margin of the flange portion 37 is an intermediate wall portion 44 which is integral with a frontal flange portion 45 disposed at right angles thereto and in parallel relation with the mounting flange portion 37 above described. Portion 45 is distinguished by a substantially medially disposed threaded opening 47 which cooperates with a mounting screw 48, as will appear presently.

It will be noted from FIG. 1 in particular that two of the bracket members 36 are provided one adjacent either lateral edge of the ramhead 16 and shield 30 for supporting the latter.

In order to enable the safety shield 30 to move vertically and pivotally relative to the ramhead for the purposes of gravitationally following the workpiece during forming operations and permitting extraction thereof from the die zone upon completion, a slide plate 50 is provided for cooperation with each of the bracket members 36 and more particularly with the frontal flange portion 45 thereof. As best shown in FIG. 4, each slide plate 50 comprises a generally rectangular elongated metal member having an elongated central slotted opening 51 therein which preferably has tapered sidewalls for cooperation with the tapered head portion 52 of the mounting screw 48. By inserting the screw 48 through the slotted opening 51, threading the same into opening 47 of the flange member 45 and locking the same in its threaded position with lock nut means 53 (see FIG. 2) the slide plate 50 is slidably movable relative to the bracket 36. It will be understood that the length of the slotted opening 51 determines the limits of relative sliding movement between the plate member 50 and bracket 36 as well as corresponding movements of the safety shield 30 which is attached thereto.

With specific reference to FIGS. 2, 3 and 4, it will be recognized that the shield member 30 is attached to the upper end of each slide member 50 by a pair of intervening hinge members 60. In brief, each hinge member has one leaf 61 attached to the rear or inside face of the shield member 30 adjacent its upper edge 62 as by rivet or like fastening means 63. Leaf member 61 has a pair of laterally spaced hub portions 64, 64 receptive of a hinge pin 65 which extends across the upper end of the slide plate 50 and through a central pivot hub 66 affixed to the slide plate. This arrangement provides pivotal interconnection between the safety shield 30 and the two slide plates 50. The coaligned axes of the pivot or hinge pins 65 lie parallel to the upper edge 62 of the safety shield and the slide plates whereby to maintain the latter parallel for sliding operation relative to the mounting brackets 36. Thus the shield is vertically movable relative to the mounting brackets 36 by virtue of the sliding interconnection between the slide plates 50 and the flange portions 45 of the mounting brackets and additionally is pivotal about the horizontal axis defined by the pins 65. With this arrangement, therefore, the safety shield 30 enjoys compound movement vertically between upper and lower limits as determined by the length of the elongated slotted openings 51 in the slide plates (see the phantom line showing in FIG. 2) as well as pivotally about the two hinge pins 64 so as to gate or swing about the upper end of the slide brackets. The pivotal capability in particular, permits a formed workpiece to be readily withdrawn from the die zone by the operator and in addition, the shield 30 may be swung upwardly and out of the way for adjustment or installation of the die as required.

Having thus described the structural aspects of the improved safety device of this invention, its use and operation will best be understood with reference to the sequential illustrations set forth in FIGS. 5 through 10 of the drawings.

As shown in FIG. 5, the transparent shield 30 is initially positioned so that the lower edge 31 thereof is spaced just slightly above and parallel to the workpiece 21 undersupported on the feed table 28. The leading edge of the workpiece 21 is fed against a first stop shoulder 70 positioned immediately adjacent the rearward side of the anvil member 18, so as to effect a first fold or bend position for the workpiece.

Figure 6:
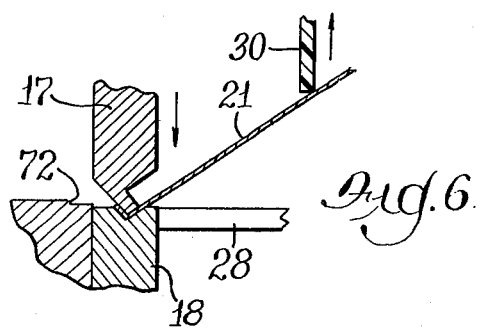

In FIG. 6 the initial folding or forming operation is illustrated, whereat the die 17 is brought into proximity with the underlying anvil to effect a first right angle bend on the intervening workpiece in the particular illustrated case. It is noteworthy to recognize that due to the sliding connection between the safety shield 30 and its support brackets 36 as heretofore described, the shield 30 is easily able to follow the upward movement of the workpiece 21 as shown in FIG. 6 produced by the bending or folding operations effected with engagement of the die and anvil.

Figure 7:
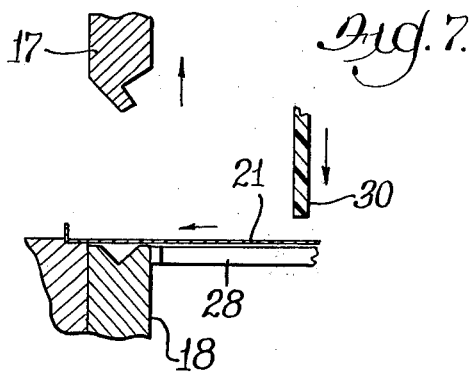

In order to provide a second bend in the workpiece, the die 17 is retracted upwardly, as illustrated in FIG. 7, and the workpiece is then inwardly to a second stop shoulder 72, with the first right angle bend or fold against such shoulder. When so positioning the workpiece, it is to be noted that the safety shield 30 automatically gravitates downwardly to its initial FIG. 5 position adjacently over the upper face of the workpiece to preclude operator invasion of the work zone.

Figure 8:
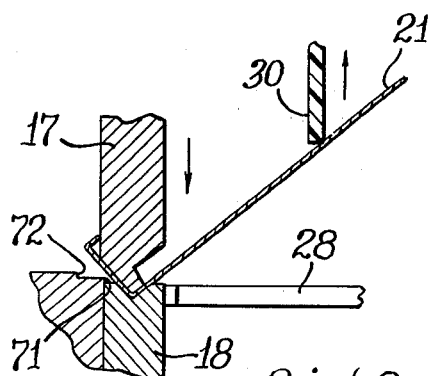

In FIG. 8 a second bending or folding operation is illustrated, wherein the die 17 is again closed over the anvil and workpiece producing a second right angle bend or fold and causing the outer end of the workpiece to angulate upwardly relative to work table 28 as there shown. Simultaneously the safety shield 30 automatically follows the workpiece upwardly upon contact thereby due to the vertical sliding action provided by its mounting system.

Upon retraction of the die 17, as illustrated in FIG. 9, the safety shield again slides downwardly to its initial near workpiece position preparatory to extraction of the workpiece from the die zone.

Figure 10:
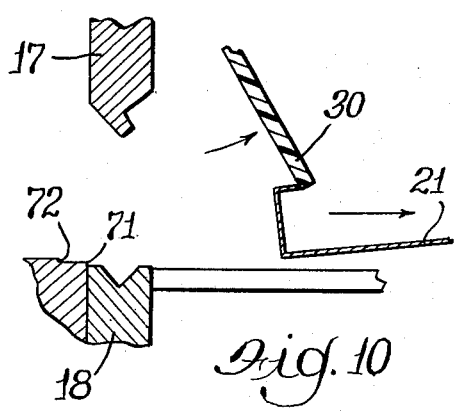

As shown in FIG. 10, withdrawal of the workpiece between the die and anvil is accomplished by withdrawing the workpiece toward the safety shield. Inasmuch as the latter is pivotally mounted by the hinge aspects of its mounting system, it readily swings outwardly to permit free passage of the completed workpiece therepast.

Thus the complete operating cycle for single or multiple bend operation of the press brake is accomplished as illustrative of the versatility and operational movements of the improved safety device of this invention and from which it will be readily recognized by those versed in this art that the safety effectively prevents or deters the operator from placing his limbs or digits in the work zone of the die and anvil as desired and in accordance with that objective of this invention. Further, it will be appreciated that the vertical sliding motion provided by the mounting system for the safety shield, readily permits the latter to follow vertical elevational movements of the workpiece during the die forming operations without the need for limit switches, sophisticated circuitry, light shield systems or the like. Due to the pivotal mounting of the safety shield relative to its support system, the same also is readily swingable to a non-interfering position for die adjustment as required or for the extraction of the finished workpieces.

From the foregoing, it is submitted that those familiar with the art will readily recognize the features of the present invention as a marked advancement over previously known safety devices of this general class. Further, while the present invention has been described in association with a preferred embodiment thereof illustrated in the accompanying drawings, it is to be understood that it is not limited by the specifics of the foregoing description and illustrative example of its teachings except as may appear in the following appended claims.

The embodiments of the invention in which an exclusive property or privilege is claimed are defined as follows:

1. A safety device for precluding accidental operator invasion of the work zone between the die and anvil of a press brake or like machine, comprising: a horizontal elongated planar safety shield vertically movable with the ramhead of the press and mounted to depend beyond the lower edge of the ramhead between the operator and the work zone of the die and anvil, and mounting means supporting said shield on said ramhead including means providing limited vertical sliding movement thereof relative to said ramhead, and additional means providing pivotal movement thereof about a horizontal axis; whereby said shield is operational to move with and relative to the ramhead for engaging a workpiece and following upward movements thereof during forming operations and additionally is swingable away from the work zone for withdrawing a formed workpiece from the die zone.

2. The combination of claim 1 wherein said mounting means comprises bracket means attachable to the front face of the ramhead, plate means slidably connected to said bracket means for limited, vertical sliding movement, and hinge means pivotally interconnecting said shield and said plate means for shield movement about said horizontal axis.

3. The combination of claim 2 wherein said mounting means comprises a pair of parallel spaced bracket means each adjustably attached to said ramhead for vertical positioning relative thereto and each having an associated said slide plate means and a said hinge means whereby said shield is mounted for movement in a vertical plane in accordance with the sliding movements of said plate means and is swingable out of said vertical plane in accordance with its pivotal connection with said plate means.

4. The combination of claim 1 wherein said shield is transparent to provide operator perception of the work zone between the die and anvil throughout workpiece formation therein.

* * * * *

UNITED STATES PATENT OFFICE
CERTIFICATE OF CORRECTION

PATENT NO. : 3,969,955
DATED : July 20, 1976
INVENTOR(S) : Robert D. Markham

It is certified that error appears in the above-identified patent and that said Letters Patent are hereby corrected as shown below:

Col. 5, line 29, after "then" insert --fed--.

Col. 5, line 61, after "safety" insert --shield--.

Signed and Sealed this

Twenty-first Day of September 1976

[SEAL]

Attest:

RUTH C. MASON
Attesting Officer

C. MARSHALL DANN
Commissioner of Patents and Trademarks